Patented Nov. 10, 1942

2,301,298

UNITED STATES PATENT OFFICE 2,301,298

ROSIN SIZE COMPOSITION AND METHOD OF PREPARING SAME

Donald W. Light, Stamford, and Russell L. Morgan, Noroton, Conn., assignors to American Cyanamid Company, New York, N. Y., a corporation of Maine No Drawing. Application November 28, 1940, Serial No. 367,580

14 Claims. (Cl. 106—144)

This invention relates to a new rosin composition suitable for use in the preparation of rosin sizes and a method for its preparation. More particularly, the invention relates to a rosin composition in which rosin or rosin soap or mixtures thereof constitute a dispersion phase and a protein solution constitutes a dispersed phase, which composition may be easily dispersed in water to give a size solution suitable for use in the sizing of paper, cloth, and the like.

Rosin size compositions are commonly prepared by (1) pouring molten rosin into an aqueous solution containing an emulsifying agent and/or caustic soda with vigorous agitation; (2) simultaneously mixing molten rosin and a saponifying solution of caustic soda or the like; and (3) adding a dilute solution of a suitable emulsifying agent to molten rosin with vigorous agitation. In each case sufficient water is employed to obtain an emulsion containing less than about 60% solids in which the rosin or rosin soap is dispersed in the aqueous medium whereby an emulsion of the oil-in-water type is obtained.

Our new rosin size composition is characterized principally by its high solids content and the fact that it is a dispersion of the water-in-oil type in which the aqueous medium is dispersed in the rosin which constitutes the continuous phase. Previous to our invention it has been thought desirable, and even necessary, when preparing rosin size emulsions, to add sufficient water to form an emulsion in which the solids content is in the dispersed phase. Such rosin emulsions were used simply by diluting the continuous phase with additional quantities of water to a consistency suitable for use. Rosin emulsions of the oil-in-water type were invariably of less than about 60% solids since it was not ordinarily possible to obtain an emulsion of this type containing a higher proportion of solid material in the dispersed phase.

We have discovered that it is possible to prepare rosin size dispersions of the water-in-oil type having a total solids content between 65 and 95% which may be mixed with water to give a size emulsion of the conventional oil-in-water type by an extremely simple method requiring a minimum of skill, time and equipment.

Our improved rosin size composition is extremely stable under ordinary conditions of handling. It is not harmed by freezing as in the case of those sizes in which water is the continuous phase. Our size may be stored in hot rooms without deterioration. It can be shipped in low cost paper bags when in solid or semi-solid form and because of the extremely low water content the shipping costs are also correspondingly lowered. In some cases our improved composition, as will be presently described, is liquid and may be added directly to the beater without previously dispersing it in water.

In preparing our new rosin size composition we may use any of the several grades of wood or gum rosin available on the market, the better and cleaner grades yielding of course a higher grade and lighter-colored size. The rosin is melted in a suitable kettle with wax, if desired. Any common wax such as paraffin, crude scale wax, candelilla wax, montan wax, carnauba wax, etc. may be used. The use of wax is entirely optional and may vary up to as much as 12% of the total composition.

When the rosin or rosin-wax blend has melted it is cooled to a point at which it may be stirred, but well below the boiling point of water, as for example 70° C. An aqueous solution of a proteinaceous emulsifying agent is next stirred into the rosin. The stirring device may be of simple construction such as a propeller type stirrer, dough mixer, or a pug mill or some similar stirring device of conventional form. The aqueous solution of proteinaceous material must be carefully added in such amount that an inversion of phase to the oil-in-water type does not occur. We have found that we may use up to about 35% water based on the total composition without phase reversal.

The aqueous solution should contain enough proteinaceous material to provide from 2 to 10% protein in the finished rosin composition. We have found that it is necessary to employ a protein solution containing at least 5% protein since otherwise it is not possible to obtain a product having 65% solids which is water-dispersible. Solutions containing up to 35% protein will be of sufficient concentration for most practical usages. We have used casein and soya bean protein to good advantage but glue, blood albumin, zein, etc. may also be employed. The protein solution is prepared by dissolving the protein in water with the aid of an alkali such as ammonia according to methods understood by the art.

When the protein solution is completely stirred into the rosin and the mixture is cooled, a dispersion is obtained in which the rosin is in the dispersion or continuous phase and the aqueous solution is in the dispersed phase. These dispersions vary in character from solid, hard and brittle materials to fluids depending upon their composition as will be more apparent from the specific examples which follow. Our rosin compositions are readily dispersed in water to give a size solution having a surprisingly small average particle diameter, generally on the order of 1 micron. Most of our compositions may be dispersed in cold water although some which have a very high percentage of free rosin require the use of hot water for dispersion. When it is desired to obtain a size dispersion having particles of extremely small diameter, we have found that the addition of ammonia or other weak alkaline material to the dispersing water greatly facilitates the attainment of this result.

Where a 100% free rosin size is not desired we may add to the molten rosin a strong alkali such as NaOH, KOH or Na$_2$CO$_3$. The amount of alkali added may vary up to enough to completely saponify all the rosin present. Since we desire to avoid the presence of unduly large amounts of water we add the strong alkali directly in solid form or, more conveniently, as a 50–70% solution. The preparation of the rosin size composition then proceeds as above described. The use of an alkali in the preparation tends to result in the formation of a product of a softer character and more readily dispersible in cold water.

Another important feature of our invention resides in the addition of small amounts of a rosin solvent to the rosin at temperatures below the boiling point of the solvent. The use of a solvent in this manner improves both fluidity and ease of water dispersion in our emulsions thus enabling us to obtain more fluid emulsions of the water-in-oil type having 65% or more total solids and better dispersion in emulsions containing as high as 95% total solids. Ethanol has proven to be the best solvent for use in our process although we have used a number of other solvents such as benzene, isopropyl alcohol, amyl alcohol and mixtures such as mixtures of acetone and ethanol.

Our invention will now be illustrated in greater detail by means of the following specific examples which are given by way of illustration and not in limitation thereof.

Example 1

480 parts of G gum rosin and 10 parts of paraffin wax were melted together and then cooled to 75° C. 210 parts of a casein solution consisting of 15.4% casein, 3.1% triethanolamine, 9.3% concentrated (26° Bé.) ammonia and 72.2% water, heated to 75° C. were slowly stirred into the molten rosin using a double blade propeller stirrer of standard type rotating at 200 revolutions per minute. When the casin solution was completely stirred into the rosin and the mixture was cooled a solid, hard, whitish dispersion was obtained of the water-in-oil type in which the aqueous casein solution was in the dispersed phase and the rosin in the dispersion or continuous phase. This dispersion was found to consist of 79.4% solids but dispersed readily in hot water to give a size solution having an average particle diameter of 0.8–1.0 micron. The aqueous dispersion at 5% solids content had a pH of 6.9. 200 cc. of the size solution at 2% solids concentration was precipitated by only 1 cc. of a 10% alum solution.

Example 2

480 parts of G gum rosin and 10 parts of paraffin wax were melted together and 10 parts of a 50% solution of NaOH slowly stirred into the molten rosin. The mixture was allowed to cool to 75° C. whereupon 215 parts of a casein solution of the same composition as in Example 1 were slowly stirred into the rosin mixture with a double blade stirrer operating at 200 revolutions per minute. A solid, slightly yellow dispersion of the water-in-oil type was formed which dispersed fairly readily in cold water to form a size solution in which the average particle diameter was about 0.8–1.0 micron. The size solution at 5% solids concentration had a pH of 8.4. 200 cc. of the size solution at 2% solids concentration was precipitated by 2 cc. of a 10% alum solution.

Example 3

480 parts of G gum rosin and 10 parts of scale wax were melted and while stirring with a double blade stirrer operating at 110 revolutions per minute there were added slowly and simultaneously 86.4 parts of a 50% solution of NaOH and 144 parts of a casein solution consisting of 23.1% casein, 4.6% triethanolamine, 14.0% concentrated ammonia and 58.3% water. Upon cooling a dark brown, sticky emulsion of the water-in-oil-type was obtained having a total solids content of about 80%. The emulsion dispersed very easily in cold water to give an aqueous size solution having an average particle size of about 1 micron.

Example 4

480 parts of G gum rosin and 10 parts of scale wax were melted and while stirring with a double blade stirrer operating at 110 revolutions per minute there were added slowly and simultaneously from separate containers and at opposite sides of the vessel containing the molten rosin 115.2 parts of a 50% NaOH solution (the theoretical amount required to completely saponify the rosin) and 259.8 parts of a casein solution similar to that used in Example 1. After the solutions were thoroughly incorporated in the molten rosin and it was cooled, a light brown, thick emulsion of the water-in-oil type was obtained which could very easily be dispersed in cold water to form a size solution having an average particle size of less than 1 micron.

Example 5

480 parts of G gum rosin and 10 parts paraffin wax were melted together and allowed to cool to 65° C. whereupon a mixture of 32 parts of acetone and 25 parts of ethyl alcohol were added. 238 parts of a casein solution similar to that used in Example 1 were then added slowly with stirring at 200 revolutions per minute with a double blade stirrer. A white, thick emulsion of the water-in-oil type was formed which could be dispersed in cold water to form an aqueous dispersion of the oil-in-water type having an average particle size of about 1.5 microns and a pH of 7.4. A 2% solution of the dispersed size was very easily precipitated by alum.

Example 6

480 parts of wood rosin and 10 parts of crude scale wax were heated to 90° C. until melted and then allowed to cool to 70° C. 57 parts of ethyl alcohol were then added. A yellow, granular mass was formed. 57.6 parts of a 50% solution of NaOH were added slowly with stirring, the granular mass gradually becoming fluid. 247 parts of a casein solution similar to that used in Example 1 was then added to the fluid rosin while stirring at 200 revolutions per minute at a temperature of about 50° C. The emulsion when cooled was of the water-in-oil type, of about 68% solids, fluid, light brown in color, and dispersed readily in cold water to give a size solution having particles of 1 to 2 microns.

Example 7

480 parts gum rosin and 10 parts crude scale wax was melted together and cooled to 70° C. whereupon 28.5 parts of a 50% solution of NaOH were added. The temperature of the mass was lowered to 50° C. and 57 parts of ethyl alcohol added. While stirring at 200 revolutions per minute 275.5 parts of a casein solution containing 13.8% casein, 2.8% triethanolamine, and 8.4% concentrated ammonia, were slowly added. A fluid, light brown emulsion of the water-in-oil type containing about 65% solids was obtained which dispersed in cold water to form a size solution having particles of about 1 to 2 microns.

Example 8

490 parts G gum rosin were melted and then 18 parts of a 70% solution of NaOH were slowly added with stirring. 5 parts of ethyl alcohol were then added to the molten rosin at a temperature of about 65° C. 32.7 parts of a casein solution consisting of 11.5 parts casein and 7.9 parts concentrated (26° Bé.) ammonia and 13.3 parts water were stirred into the molten rosin with a double blade stirrer operating at 210 revolutions per minute. The stirring was continued for 10 minutes. Upon cooling a light brown, hard and brittle emulsion of the water-in-oil type containing 94.6% solids was obtained. Although this emulsion can be dispersed by hot water alone the dispersing is greatly facilitated if 15% of ammonia, based on the weight of the solid composition, is added to the dispersing water. A size solution so produced has an average particle size of less than 1 micron and has excellent sizing characteristics.

Example 9

480 parts of G gum rosin and 10 parts of scale wax were melted together and 28.5 parts of a 50% solution of NaOH were slowly stirred in. 57 parts of ethyl alcohol were added and 275 parts of a protein solution consisting of 13.8% soya bean protein, 2.8% triethanolamine, 8.4% ammonia and 75.0% water were stirred into the molten mass which was at a temperature of 45° C. A brown, fluid emulsion of the water-in-oil type was obtained which dispersed readily in warm water.

Example 10

490 parts of wood rosin were melted in a dough mixer and cooled to about 70° C. whereupon 60 parts of a 50% solution of NaOH were added with agitation. 58.5 parts of ethanol were then added followed by the addition of 250.6 parts of a solution consisting of 38.7 parts casein, 7.7 parts triethanolamine, 23.2 parts 26° Bé. ammonia and 181.0 parts water. When cooled a light brown, fluid emulsion of the water-in-oil type was obtained consisting of about 65% solids. This rosin composition could be added directly to the beater without intermediate dilution. Excellent sizing results were obtained upon precipitation with alum in the conventional manner.

What we claim is:

1. An autodispersible rosin composition capable of forming an emulsion of the oil-in-water type when stirred with water comprising a dispersion containing 65–95% total solids having an external phase comprising essentially a member of the group consisting of rosin and rosin soap andmixtures thereof and an internal phase consisting essentially of a protein solution.

2. An autodispersible resin composition capable of forming an emulsion of the oil-in-water type when stirred with water comprising a dispersion containing 65–95% total solids having an external phase comprising essentially a rosin solvent and a member of the group consisting of rosin and rosin soap and mixtures thereof and an internal phase consisting essentially of an alkaline solution of casein.

3. An autodispersible rosin composition capable of forming an emulsion of the oil-in-water type when stirred with water comprising a dispersion containing 65–95% total solids having an external phase comprising essentially ethanol and a member of the group consisting of rosin and rosin soap and mixtures thereof and an internal phase consisting essentially of a protein solution.

4. An autodispersible rosin composition capable of forming an emulsion of the oil-in-water type when stirred with water comprising a dispersion containing 65–95% total solids having an external phase comprising essentially a member of the group consisting of rosin and rosin soap and mixtures thereof and an internal phase consisting essentially of an alkaline solution of soya bean protein.

5. An autodispersible rosin composition capable of forming an emulsion of the oil-in-water type when stirred in water comprising a dispersion containing 65–95% total solids having a dispersion phase comprising essentially rosin and a dispersed phase consisting essentially of a protein solution.

6. An autodispersible rosin composition capable of forming an emulsion of the oil-in-water type, comprising a dispersion containing 65–95% total solids containing a dispersion phase comprising essentially 75% free rosin and 25% of an alkali rosinate and a dispersed phase consisting essentially of an alkaline protein solution.

7. An autodispersible rosin composition capable of forming an emulsion of the oil-in-water type, comprising a dispersion containing 65–95% total solids having a dispersion phase comprising essentially 50% free rosin and 50% of an alkali rosinate and a dispersed phase consisting essentially of an alkaline protein solution.

8. A method of preparing an autodispersible rosin composition which comprises stirring into molten rosin a protein solution containing 5–35% of protein, whereby a dispersion of the protein solution is obtained, and stopping the addition of the protein solution while the rosin remains as the dispersion phase and the product contains 65–95% total solids.

9. A method of preparing an autodispersible rosin composition which comprises stirring into molten rosin a solution of a strong alkali and a protein solution containing 5–35% of protein whereby a dispersion of the protein solution is obtained and stopping the addition of the protein solution while the rosin remains as the dispersion phase and the product contains 65–95% total solids.

10. A method of preparing an autodispersible rosin composition which comprises stirring into molten rosin a solution of a strong alkali and a small amount of a rosin solvent, and then a protein solution containing between 5 and 35% protein, whereby dispersion of the protein solution is obtained and stopping the addition of protein solution while the rosin remains as the dispersion phase and the product contains 65–95% total solids.

11. A method of preparing an autodispersible rosin composition which comprises stirring into molten rosin a rosin solvent and then a protein solution containing between 5 and 35% of protein, whereby a dispersion of the protein solution is obtained, and stopping the addition of the protein solution while the rosin remains as the dispersion phase and the product contains 65–95% total solids.

12. A method of preparing an autodispersible rosin composition which comprises stirring into molten rosin a solution of NaOH, a small amount of ethanol and then an alkaline solution of casein containing between 5 and 35% casein, whereby a dispersion of the casein solution is obtained, and stopping the addition of the casein solution while the rosin remains as the dispersion phase and the product contains 65–95% total solids.

13. A method of preparing an autodispersible rosin composition which comprises stirring into molten rosin a solution of NaOH, a small amount of ethanol and then an alkaline solution of soya bean protein containing between 5 and 35% of soya bean protein, whereby a dispersion of the soya bean protein solution in rosin is obtained, and stopping the addition of the soya bean protein solution while the rosin remains as the dispersion phase and the product contains 65–95% total solids.

14. A method of preparing an autodispersible rosin composition which comprises stirring into molten rosin an aqueous solution containing between 5% and 35% protein and stopping the addition of the protein solution while the total solids content lies between 65% and 95% and while the protein solution remains dispersed in the rosin.

DONALD W. LIGHT.
RUSSELL L. MORGAN.